Jan. 19, 1943.  C. K. NOVOTNY ET AL  2,308,951
CONTINUOUS MANUFACTURE OF RUBBER SHEETING
Filed March 28, 1939
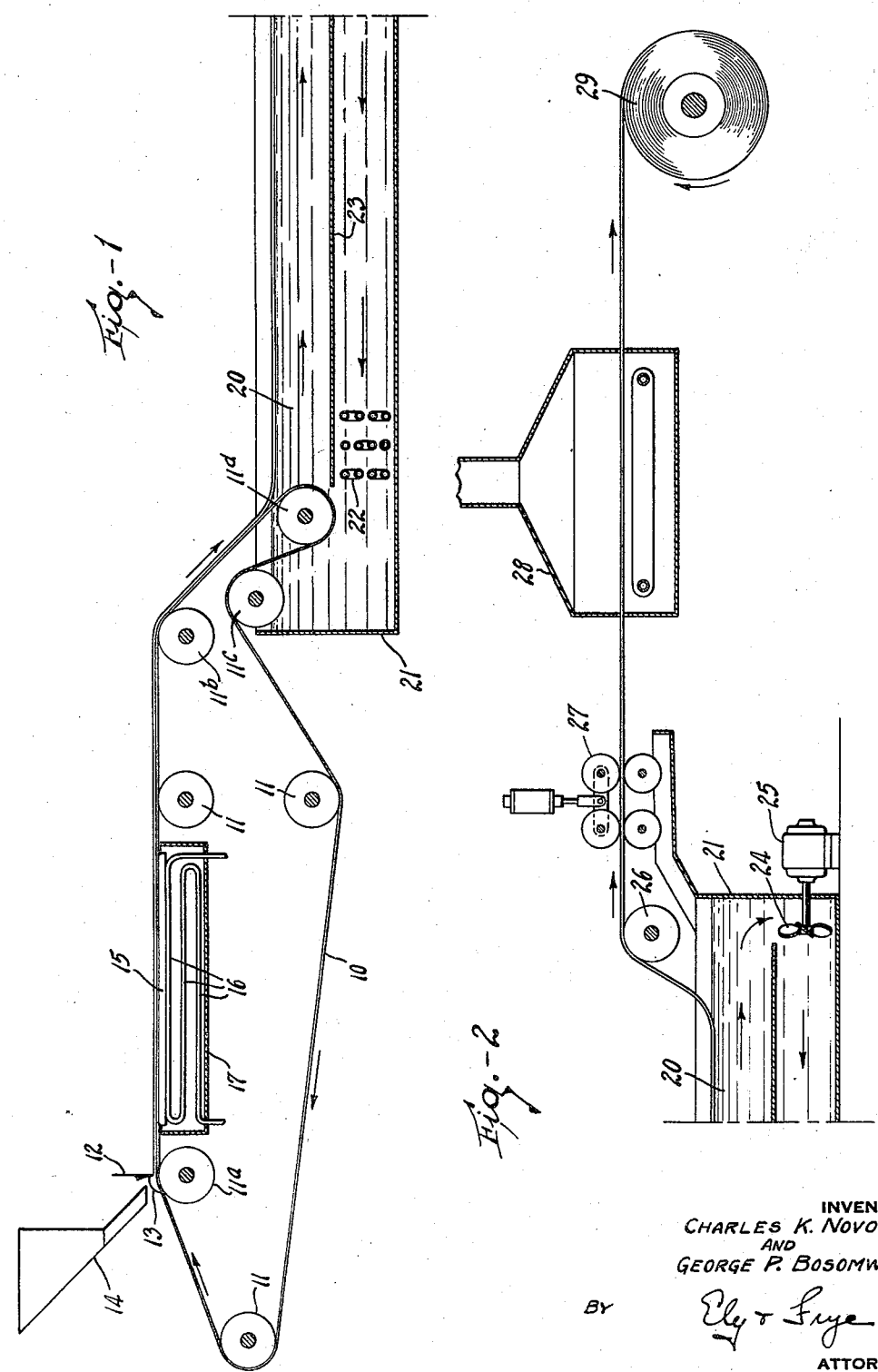
INVENTOR
CHARLES K. NOVOTNY
AND
GEORGE P. BOSOMWORTH
BY
Ely & Frye
ATTORNEYS Patented Jan. 19, 1943

2,308,951

UNITED STATES PATENT OFFICE 2,308,951

CONTINUOUS MANUFACTURE OF RUBBER SHEETING

Charles K. Novotny and George P. Bosomworth, Akron, Ohio, assignors to The Firestone Tire & Rubber Company, Akron, Ohio, a corporation of Ohio Application March 28, 1939, Serial No. 264,522

7 Claims. (Cl. 18—57)

This invention relates to the production of rubber articles from latex, more especially to the continuous formation of porous rubber sheeting from foamed latex.

Heretofore porous rubber articles have been formed from foamed latex by molding bodies of foamed latex to the desired shape and then gelling the latex while in the mold. Naturally this produces a rubber body of the desired shape, but it involves the use of a large number of molds while considerable hand labor is involved in filling the molds and removing the products therefrom. The gellation of the latex in the mold necessitates the use of bulky and expensive apparatus and costly processing as the molds and contents must be submitted to conditions producing gellation and then the subsequent vulcanization of the rubber in the mold before it is removed therefrom. All of these steps are expensive due to the extensive labor and apparatus involved so that the cost of the finished products is high and prevents such articles from being used for many of the purposes for which they are adapted. Also, the production of continuous rubber sheeting is not possible when molds are used.

Thus the general object of this invention is to overcome and eliminate disadvantages attendant molding processes for the production of rubber bodies and to provide a continuous method of manufacturing either porous or non-porous rubber strips, sheeting, etc., in which a minimum of labor and apparatus are involved.

Another object of the invention is to provide an easily practiced method of obtaining porous rubber from latex in which the porous structure of the rubber is not broken down in the manufacturing process.

Another object of the invention is to vulcanize and wash porous rubber simultaneously. The foregoing and other objects will be manifest from the following specification.

The invention will be described particularly with reference to the accompanying drawing in which Figure 1 is a diagrammatic view of the first portion of apparatus for performing the method of the invention; and Figure 2 is a similar view of the remainder of the apparatus.

The present invention, broadly speaking, resides in the formation of a continuous body or length of latex on a belt and then gelling the latex in its given form while still on the belt. This gelled latex rubber is then removed from the belt, without injury or breakdown of the structure thereof, which may be porous, by immersing the belt in water which floats the rubber strip from the belt. The movement of the belt relative to the water assists the buoyancy of the water in lifting the rubber from the belt. Usually the water supporting the rubber is heated to vulcanize the rubber as it floats thereon, after which the rubber is drawn from the water tank. In some instances it has been found desirable to give the water lifting the rubber from the belt a flow, or motion, to facilitate and assist in the removal of the rubber from the belt and in carrying the rubber strip through the water tank.

Turning now to the drawing, an endless belt 10, made from aluminum or other smooth surfaced, or waxed material to which heated rubber does not adhere, is shown looped around a plurality of pulleys 11. One pulley 11a has a doctor, or spreading knife 12, positioned immediately above it. This doctor 12 serves to spread foamed latex 13 supplied to the belt 10 by a hopper 14 over the surface of the belt. Obviously the doctor 12 can be positioned in any desired relationship with the belt. In some instances, it may be advisable to provide siding for the belt 10 to retain the latex thereon.

The latex 13 supplied to the belt 10 is of any suitable vulcanizable composition, and may include any of the well known compounding and vulcanizing agents for latex. Preferably the latex contains a gelling agent which will either gel the latex at room temperature or it may cause gelling only at elevated temperatures. The specific example of the invention described herein will cover practice of the invention when heat sensitive gelling agents and foamed or frothed latex are used. After the foamed latex 13 is distributed over the surface of the belt, the belt 10 is drawn over a gelling platen 15. The platen 15 may be heated by steam pipes 16, directly thereunder, which keep the platen at an elevated temperature, for example, about 90 to 95° C. as that secures rapid gellation of the foamed latex without appreciable breakdown of same. Usually the temperature of the platen should be maintained below 100° C. as that produces steam in the porous latex and changes the structure thereof. However, it may be heated to above 100° C. and the foamed latex passed thereover rapidly enough that the foam's temperature does not rise above 100° C. Naturally the speed of the belt 10 and the length of the platen 15 are correlated with the thickness of the foamed latex being gelled so that complete gellation of same is secured while the portion of the belt carrying the latex is in the oven. A hood, or cover 17, may be positioned around the pipes 16 to retain heat therefrom in contact with the platen 15. When an ordinary room temperature coagulant is used, then the platen 15, or other gelling apparatus for heat sensitive latex may be dispensed with and the distance between the doctor 12 and the vulcanizing tank may be increased, if desired, so that complete gellation is secured before the latex is brought to the tank.

A hot water vulcanization tank 21 is positioned adjacent the end of the platen 15 to vulcanize the gelled rubber fed thereto. This tank 21 is substantially filled with hot water 20 that is maintained at a temperature suitable for curing and below 100° C. by coils 22 that are in the tank 21 and that connect to a suitable source of steam (not shown). The belt 10 is led over pulleys 11b and 11c, which are at the end of the tank 21 adjacent the dryer, and pulley 11d in the tank so that the belt 10 moves downwardly to insert itself in the hot water 20. As the belt 10, carrying the porous rubber formed by the gellation of the latex, is plunged into or immersed in the tank, the water 20 exerts a buoying or lifting effect on the rubber. Since the rubber has a slightly lower specific gravity than the water it floats on the surface of the water and therefore is removed from the belt 10 as it has no adherence to the belt. This floating off of the rubber from the belt by inserting the belt in the water is an important feature of the invention as it permits the continuous sheet of porous rubber formed on the belt to be removed without any breakdown or damage to the porous rubber structure formed. Since this porous rubber is in its freshly gelled, unvulcanized state, any mechanical force exerted thereon will permanently deform it.

From the tank 21 the belt 10 is led over further pulleys 11 and back to the starting pulley 11a. In some cases it may be necessary to cool the belt 10 before further foamed heat sensitive latex is placed upon it, but ordinarily the belt will have been cooled sufficiently merely in travelling from the pulley 11d to pulley 11a so that specific cooling apparatus is not required.

After the rubber sheet from the belt 10 is deposited in the hot water tank 21, it immediately becomes saturated with the hot water of the tank and vulcanization commences. It has been found that vulcanizing porous rubber by inserting it in hot water effects more rapid vulcanization than when the porous rubber is merely placed in a vulcanization oven as the water penetrates the inner portion of the porous rubber better than air does. Also, there are no molds to heat to vulvanization temperatures as in immersing molds in hot water. The porous rubber sheet in the tank 21 may be drawn therethrough by a slight pull exerted on the leading end of it which is removed from the vulcanization tank 21 and this prevents the rubber from piling up as it is removed from the belt 10. However, it has been found desirable to circulate the water in the tank 21. To this end a horizontally positioned diaphragm 23 is provided in the tank and a propeller 24, driven by a motor 25, is provided at one end of the tank. This propeller 24 produces a small but desirable flow of water in a clockwise manner around the diaphragm 23 that is spaced from the ends of the tank. Thus slight movement of the water first contacted by the porous rubber on the belt 10 assists in drawing or floating the porous rubber from the belt. The water flow also carries the rubber through the tank 21.

From the vulcanization tank 21, the porous rubber produced is led over a pulley 26 and passed through a series of squeezing rolls 27 that are positioned at the exit end of the tank 21. Then the sponge moves through a drying oven 28 which removes the last trace of moisture from the sponge. Finally the porous rubber so produced may be wound upon a roll 29 for storage, or otherwise treated, as desired. Thus sometimes the porous rubber may be cut into the desired size articles in place of being wound upon a roll as a continuous piece of material.

Attention is called to the fact that the speed at which the porous rubber is drawn through the tank 21 varies with the thickness of the porous rubber sheet being formed. Also, the length of the platen 15, drying oven and vulcanization tank determine the speed of movement of the rubber strip through the apparatus.

In all events, it will be appreciated that an inexpensive, easily practiced method for forming a continuous body of porous rubber has been provided. This porous rubber may be made of any desired form or thickness by constructing the belt 10 and the spreader 12 in the desired manner. It it even possible to produce porous rubber suitable for use as cushions by providing upstanding pins on the belt 10. These pins would produce voids on the undersurface of the porous rubber layer formed by gelling latex on the belt and be retained thereafter by vulcanizing the rubber so that a porous rubber sheet having a perforated undersurface, as common in rubber cushion construction, would be formed by the apparatus.

As previously indicated, the present apparatus and method also could be used in the manufacture of ordinary impervious rubber sheeting from latex but it is particularly adapted to forming continuous sponge rubber strip.

When a rubber having a specific gravity greater than one is to be formed by the apparatus shown, it would be necessary to dissolve substances in the hot water 20 to raise its gravity over that of the rubber to be carried thereby.

It is a well known fact that sponge rubber must be washed before it is a finished product. Vulcanizing the sponge by immersing it in water has been found to wash the sponge simultaneously with the vulcanization thereof so that in some cases, it may be possible to eliminate entirely any further washing of the sponge after it is removed from the tank 21. The present process at least reduces the amount of washing required.

In some instances, such as in the manufacture of impervious rubber sheeting, it may be desirable to vulcanize the continuous rubber strip otherwise than in the water of tank 21. Then the tank 21 should contain cold water which would remove the rubber from the belt 10 after which the rubber would be lifted from the water and be passed through any desired type of vulcanization apparatus.

The dryer 28 obviously can be of any desired construction and could be used as a combined vulcanizing and drying chamber when desired.

In a further modification of the invention, hot water is sprayed upon the upper surface of the rubber sheet in the vulcanization tank 21. This is particularly desirable in manufacturing impervious rubber but its use generally increases the rate of vulcanization and aids in securing uniform, or complete vulcanization.

The term latex in the accompanying specification and claims is taken to mean any dispersion of rubber whether naturally or artificially produced and whether vulcanized or not, although the invention normally is practiced with unvulcanized rubber.

While a written description and illustration of one embodiment of the invention is disclosed herein, it will be understood that various modifications can be made without departing from the scope of the invention as defined in the appended claims.

What is claimed is:

1. That method of continuously making sponge rubber sheeting comprising the steps of spreading foamed heat sensitive latex uniformly over the surface of a belt, associating the belt with a heated chamber to gel the foamed heat sensitive latex and form a porous rubber sheet on the belt, drawing the belt downwardly into a hot water bath which floats the porous rubber from the belt, floating the porous rubber on the water while moving it slowly through the tank to vulcanize the rubber, washing the rubber simultaneously with the vulcanization thereof, and drying the vulcanized porous rubber produced.

2. That method of continuously making sponge rubber sheeting comprising the steps of spreading foamed heat sensitive latex uniformly over the surface of a belt, associating the belt with a heated chamber to gel the foamed heat sensitive latex and form a porous rubber sheet on the belt, inserting the belt into a water bath, floating the rubber from the belt, and slowly moving the rubber through the water bath while floated thereon to vulcanize the rubber.

3. That method of continuously making sponge rubber sheeting comprising the steps of spreading foamed latex uniformly over the surface of a belt, gelling the foamed latex to form a porous rubber sheet on the belt, immersing the belt in hot water to remove the rubber from the surface of the belt, and retaining the rubber in the hot water to vulcanize the rubber.

4. That method of continuously making rubber sheeting comprising the steps of spreading heat sensitive latex uniformly over the surface of a belt, gelling the latex to form a rubber sheet on the belt, immersing the belt in hot water to remove the rubber from the surface of the belt, and retaining the rubber in the hot water to vulcanize the rubber.

5. That method of continuously making rubber sheeting comprising the steps of spreading latex uniformly over the surface of a belt, gelling the latex to form a rubber sheet on the belt, immersing the belt in hot water to remove the rubber from the surface of the belt, and spraying hot water on the upper surface of the rubber to assist the vulcanization thereof while retaining the rubber in the hot water to vulcanize the rubber.

6. That method of manufacturing rubber continuously from latex comprising the steps of continuously distributing latex over a moving surface, gelling the latex to rubber while on the moving surface to form a continuous rubber strip thereon, immersing the moving surface in a body of water which acts to float the rubber strip from the moving surface, and associating the rubber strip with heated means to vulcanize same.

7. That method of manufacturing rubber continuously from latex comprising the steps of distributing latex over a moving surface, gelling the latex to rubber on the moving surface, immersing the moving surface in a flowing body of hot water to float the rubber from the moving surface, moving the rubber along with the hot water due to the flow thereof, and vulcanizing the rubber by the hot water supporting it.

CHARLES K. NOVOTNY.
GEORGE P. BOSOMWORTH.